UNITED STATES PATENT OFFICE.

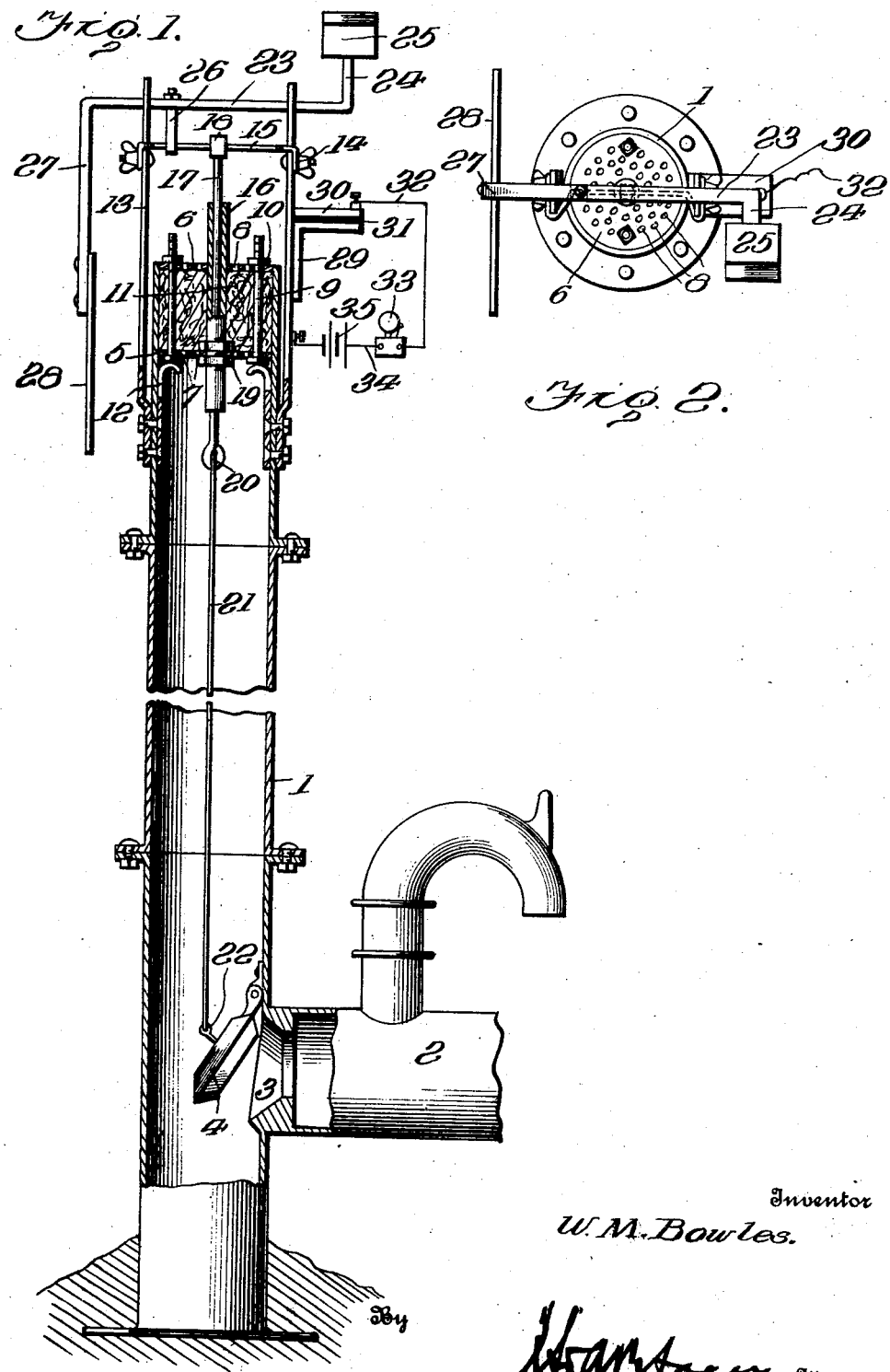

WILLIAM M. BOWLES, OF SHAWNEE, OKLAHOMA.

SAFETY-VENT FOR OIL-STORAGE TANKS.

1,265,877.   Specification of Letters Patent.   Patented May 14, 1918.

Application filed February 7, 1916. Serial No. 76,699.

*To all whom it may concern:*

Be it known that I, WILLIAM M. BOWLES, a citizen of the United States, residing at Shawnee, in the county of Pottawatomie and State of Oklahoma, have invented certain new and useful Improvements in Safety-Vents for Oil-Storage Tanks, of which the following is a specification.

This invention relates to safety vents for oil storage tanks and has as its object to provide a safety vent so constructed as to practically eliminate the danger from ignition of the gases arising from the oil through the vent in the event of the said vent being struck by lightning or in the event of fire in the vicinity thereof.

Another aim of the invention is to so construct the vent that the gases arising from the oil within the storage tank may have free escape to the atmosphere and yet provide against ignition of the gases or the oil within the vent or tank even though the escaping gases become ignited at the discharge from the vent. Therefore, incidentally the invention aims to provide means for preventing flame from communicating with the interior of the vent even though the gases issuing from the vent become ignited and burn for a considerable length of time.

In the accompanying drawings:

Figure 1 is a vertical longitudinal sectional view through the vent embodying the present invention.

Fig. 2 is a top plan view of the said vent.

In the drawings the numeral 1 indicates an upright vent pipe through which the gases are to be permitted to escape and into which the gases are conducted by a pipe 2 which leads from the oil storage tank (not shown) and which tank may be of any suitable construction and located or arranged in any desired manner. At the point of communication of the pipe 2 with the vent pipe 1 there is provided an inclined valve seat indicated by the numeral 3 and pivoted above this seat is a valve 4 designed to be normally held open by means to be presently described and designed when such means becomes inactive to drop by gravity to closed position upon the seat whereby to close the passage between the pipe 2 and pipe 1 and thereby further insure against communication of flames with the interior of the pipe 2. The gases arising from the oil within the storage tank enter the pipe 1 by way of the pipe 2 and are permitted to escape through the upper end of the pipe 1, but in order that flames in the vicinity of the discharge end of the pipe may not communicate with and ignite the gases within the pipe 1, and in order that the gases within the pipe 1 may be prevented from becoming ignited in the event of the pipe being struck by lighting, means is provided in the upper end of the pipe and will now be specifically described. The said means includes a pair of spaced plates or heads the lower one of which is indicated by the numeral 5 and the upper one by the numeral 6 and these heads are provided respectively with perforations 7 and 8 and in order that the heads may be adjustably connected bolts 9 are fitted through the heads and the head ends of these bolts bear against the underside of the head 5 and nuts 10 are threaded upon the upper ends of the bolts and bear downwardly upon the upper head 6. The heads are of a diameter to fit snugly within the interior of the upper end of the vent pipe 1 and the space between these heads and surrounded by the said upper end of the pipe is filled with a packing 11 of any suitable non-heat conducting material such for example as steel or aluminum wool or spun glass or, if desired, asbestos wool. The device just described is supported within the upper end of the pipe 1 by suitable bracket members 12 secured to opposite sides of the wall of the pipe below the upper end thereof and upon which members the head ends of the bolts or, if desired, the lower head 5, rest. It will now be apparent that the heads 5 and 6 and the wall of the pipe 1 form a cylindrical chamber within which the packing 11 is arranged and it will further be understood that by tightening the nuts 10 the head 6 will be forced downwardly toward the head 5 so as to more or less compress the said packing 11 and render the same more or less compact as may be desired. It will be further understood at this point that the gases arising from the oil within the storage tank may pass upwardly within the pipe 1 and through the perforations in the heads 5 and 6 and the packing 11 and to the atmosphere. However, in view of the non-heat conducting nature of the packing material 11, even should the gases become ignited above the head 6, the gases within the pipe 1 would not become ignited until the gases above the head had been burning for such length of time as to heat the packing to redness and before this would occur all of the gases within the pipe 1 would have been consumed owing to the fact that the valve 4 would in the meantime have been permitted to drop to closed position.

Secured to the pipe 1 and extending upwardly exteriorly of the said pipe at opposite sides thereof, and above the upper end thereof, are uprights 13, each of which carries a binding post or similar securing device indicated by the numeral 14, and these binding posts secure the ends of a fuse wire 15 which extends transversely between the said uprights, as clearly shown in the drawings. The heads 5 and 6 are provided centrally each with an opening and fitted through these openings and through the packing 11 between the said heads is a tube 16, the bore of which is smoothly finished and snugly yet slidably receives a rod indicated by the numeral 17. At its upper end the rod 17 is provided with an eye 18 through which the fuse wire 15 passes and the rod is in this manner supported against downward movement by the said fuse wire. The tube 16 is held against longitudinal movement by means of nuts 19 which are threaded thereon and bear against the under and upper faces of the head 5 as clearly shown in Fig. 1 of the drawings. Connected as at 20 to the lower end of the rod 17 is a wire or the like indicated by the numeral 21 and this wire is connected at its lower end to the valve 4 as indicated by the numeral 22. It will now be apparent that under normal conditions the valve is supported in open position but that in the event of the vent pipe being struck by lightning or in the event of fire in the immediate vicinity of the discharge end of the said pipe, the fuse wire 15 will be fused and as the rod 17 will then no longer be afforded support against downward sliding movement within the tube 16, the valve 4 will fall by gravity to its seat, thereby closing the passage between the pipes 1 and 2 and preventing communication of flame with the interior of the pipe 2 in the event that the gases within the pipe 1 should become ignited. By providing the tube 16 and rod 17 and by having the rod fit slidably and yet snugly within the tube, the rod is permitted to move downwardly immediately upon fusing of the wire 15 and yet no gases are permitted to escape to the atmosphere around the said rod and consequently danger of ignition of the gases within the tube 1 is minimized. It will be understood that the eye 18 serves not only as a convenient means for connecting the upper end of the rod 17 with the fusible element 15 but that this eye serves also, by striking against the upper end of the tube 16, as a means for limiting the downward movement of the rod when the wire 15 is fused.

In order that a visible and audible signal may be given when the fuse wire 15 is fused, a shaft 23 is mounted in the upper ends of the uprights 13 and has at one end an arm 24 carrying a weight 25 which normally tends to rock the shaft in one direction. The shaft, however, is restrained against such movement by the engagement of an arm 26 carried thereby with the fuse wire 15. At its other end the shaft is provided with an arm 27 carrying a signal vane or blade 28 which constitutes the visible signal, being swung upwardly as the shaft is rocked through the instrumentality of the weighted arm upon the fusing of the wire 15. A bracket 29 is secured upon one of the uprights 13 and supports a contact plate 30 which is insulated as indicated at 31 and as the weighted arm 24 swings downwardly upon fusing of the fuse wire 15 the weight 25 will strike against the contact plate 30, as will be apparent by reference to Fig. 1. A wire 32 is connected to the plate 30 and to one binding post of an electric bell or other visible or audible signal indicated at 33 and a wire 34 is connected to the other binding post of this signal and to the said upright or to some other portion of the structure in electrical circuit with the shaft 23 and with the arm 24 and weight 25. A battery 35 is interposed in the wire 34.

Having thus described the invention, what is claimed as new is:

1. A vent for oil storage tanks having an outlet, a permeable filling of non-heat conducting material arranged within the said outlet, a tube extending through the said filling, a rod slidably mounted in the tube and fitting closely therein, a fusible element above the filling normally supporting the rod against downward movement within the tube, an inlet to the said vent, a valve for closing the inlet, and connection between the said rod and valve normally supporting the valve in open position.

2. A vent for oil storage tanks having an outlet, spaced perforated heads arranged within the outlet, a permeable filling of non-heat conducting material arranged within the outlet between the said heads, a tube fitted through the said heads and filling, a rod snugly and slidably fitted within the said tube, brackets secured to and rising above the vent, a fusible element mounted in said brackets above the vent and normally supporting the rod against downward movement in the tube, the vent having an inlet, a valve for closing the inlet, and connection between said rod and the said valve normally supporting the valve in open position.

3. In a vent for oil storage tanks, a vent pipe having an inlet, a valve for closing the inlet, a filling of non-heat conducting material arranged within the discharge end of the said vent pipe, a tubular guide extending through the said filling, a fusible element located above the outlet end of the said vent pipe, a rod normally supported by said fusible element and slidably snugly fitting within the said tubular guide, and connection between the said rod and the said valve.

4. In a vent for oil storage tanks, a vent pipe having an inlet, a valve for closing the inlet, a filling of non-heat conducting material within the discharge end of the said vent pipe, a tubular guide extending through said filling and supported against downward movement, a rod slidably snugly fitting within the guide, connection between the said rod and the valve, a fusible element normally supporting the rod in raised position, and means upon the rod for coaction with the upper end of the said tubular guide to limit the downward movement of the rod.

5. In a vent for oil storage tanks, a vent pipe having an inlet, a valve for closing the inlet, a filling of non-heat conducting material within the discharge end of the vent pipe, a tubular guide extending through the said filling, a rod slidably snugly fitting within the guide, connection between the lower end of the rod and the said valve, the rod being provided at its upper end with an eye, and a fuse wire fitted through the said eye and supported above the discharge end of the said pipe, the said eye constituting means for limiting the downward movement of the rod in the said guide.

6. In a vent for oil storage tanks, a vent pipe, spaced upper and lower heads disposed within the outlet end of said pipe, a compressible filling of fibrous non-heat conducting material disposed between the said heads, a tubular guide fitted through openings formed in the heads, the heads being foraminous, nuts threaded upon the tubular guide and bearing against the upper and under faces of the lower head whereby to secure the guide against displacement with relation to the said head, the upper head being slidably movable upon the guide, bolt rods fitted through the heads, nuts threaded upon the bolt rods and bearing against the upper head and adjustable to force the same downwardly toward the lower head whereby to compress the filling, a fusible element located above the tubular guide, a rod fitting slidably within the tubular guide and connected with the said fusible element, the vent pipe having an inlet, a valve for closing the inlet, and connection between the valve and the said rod normally supporting the valve in open position.

In testimony whereof I affix my signature.

WILLIAM M. BOWLES. [L. S.]

Copies of this patent may be obtained for five cents each, by addressing the "Commissioner of Patents, Washington, D. C."